United States Patent
Balsam et al.

(10) Patent No.: US 11,736,535 B1
(45) Date of Patent: Aug. 22, 2023

(54) COMMUNICATION IN AN ARTIFICIAL REALITY DEVICE DUE TO PREDICTED ACQUAINTANCE INTERCEPTION

(71) Applicant: Meta Platforms Technologies, LLC, Menlo Park, CA (US)

(72) Inventors: Nava K Balsam, Woodinville, WA (US); Michaela Warnecke, Somerville, MA (US); Dianmin Lin, Los Altos, CA (US); Ana Garcia Puyol, Mountain View, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 112 days.

(21) Appl. No.: 17/499,677

(22) Filed: Oct. 12, 2021

(51) Int. Cl.
| | | |
|---|---|---|
| H04L 65/00 | (2022.01) | |
| H04L 65/1069 | (2022.01) | |
| H04W 8/00 | (2009.01) | |
| G06F 3/01 | (2006.01) | |
| H04L 51/04 | (2022.01) | |
| H04W 4/02 | (2018.01) | |

(52) U.S. Cl.
CPC .......... H04L 65/1069 (2013.01); G06F 3/011 (2013.01); H04L 51/04 (2013.01); H04W 4/023 (2013.01); H04W 8/005 (2013.01)

(58) Field of Classification Search
None
See application file for complete search history.

(56) References Cited

U.S. PATENT DOCUMENTS

| | | | |
|---|---|---|---|
| 8,472,976 B1* | 6/2013 | Ledet | H04L 67/52 709/204 |
| 8,977,291 B1* | 3/2015 | Ledet | H04W 4/023 709/204 |
| 2014/0003648 A1* | 1/2014 | Fedorovskaya | G06Q 50/01 382/100 |
| 2015/0172855 A1* | 6/2015 | Mishra | H04W 4/029 455/418 |
| 2016/0094437 A1* | 3/2016 | On | H04M 3/42263 370/352 |
| 2018/0005429 A1* | 1/2018 | Osman | A63F 13/56 |
| 2018/0102999 A1* | 4/2018 | Keysers | H04L 67/54 |
| 2019/0179955 A1* | 6/2019 | Geyer | G06N 20/20 |

* cited by examiner

*Primary Examiner* — Martin Mushambo
(74) *Attorney, Agent, or Firm* — McDermott Will & Emery LLP

(57) ABSTRACT

Methods, systems, and storage media for initiating communication between artificial reality devices are disclosed. Exemplary implementations may: enable a discovery setting by a first user wearing a first artificial reality device; detect a presence of at least a second user wearing a second artificial reality device; determine a familiarity level of the first user with the second user; and in response to the familiarity level breaching a familiarity threshold, initiate a call with the second artificial reality device by the first artificial reality device, the call including an interaction in an artificial reality environment accessed via the first artificial reality device and the second artificial reality device.

20 Claims, 6 Drawing Sheets

COMMUNICATION IN AN ARTIFICIAL REALITY DEVICE DUE TO PREDICTED ACQUAINTANCE INTERCEPTION

TECHNICAL FIELD

The present disclosure generally relates to initiating communication between artificial reality devices, and more particularly to communication in an artificial reality device due to predicted acquaintance interception.

BACKGROUND

Video chat, particularly through the 2020 coronavirus pandemic, has become a widely adopted and often preferred method for individuals to connect at a distance in a more personal way compared to traditional, voice-only telephone. There are many indications that this trend will continue as remote work, virtual shopping, etc., become a daily reality for more and more individuals. Artificial reality headsets (e.g., virtual reality, augmented reality, mixed reality, etc.) take video chat a fundamental step further via the "realness" of conversing with a three-dimensional digital likeness in an artificial reality environment. Applications for personal interactions in artificial reality are found throughout personal, educational, and professional activities.

BRIEF SUMMARY

The subject disclosure provides for systems and methods for initiating communication between artificial reality devices. A user is allowed to be alerted in an artificial reality environment that a familiar person is nearby or approaching the user in the real world. For example, the user may receive a notification via their artificial reality headset that the familiar person is nearing, which lets them opt to ignore or engage the familiar person in the virtual reality environment before the familiar person is within speaking distance of the user.

One aspect of the present disclosure relates to a method for initiating communication between artificial reality devices. The method may include enabling a discovery setting by a first user wearing a first artificial reality device. The method may include detecting a presence of at least a second user wearing a second artificial reality device. The second user may be different from the first user. The second artificial reality device may be different from the first artificial reality device. The discovery setting may be also enabled on the second artificial reality device. The method may include determining a familiarity level of the first user with the second user. The method may include, in response to the familiarity level breaching a familiarity threshold, initiating a call with the second artificial reality device by the first artificial reality device, the call including an interaction in an artificial reality environment accessed via the first artificial reality device and the second artificial reality device.

Another aspect of the present disclosure relates to a system configured for initiating communication between artificial reality devices. The system may include one or more hardware processors configured by machine-readable instructions. The processor(s) may be configured to enable a discovery setting by a first user wearing a first artificial reality device. The processor(s) may be configured to detect a presence of at least a second user wearing a second artificial reality device. The second user may be different from the first user. The second artificial reality device may be different from the first artificial reality device. The discovery setting may be also enabled on the second artificial reality device. The processor(s) may be configured to determine a familiarity level of the first user with the second user. The processor(s) may be configured to, in response to the familiarity level breaching a familiarity threshold, initiate a call with the second artificial reality device by the first artificial reality device, the call including an interaction in an artificial reality environment accessed via the first artificial reality device and the second artificial reality device.

Yet another aspect of the present disclosure relates to a non-transient computer-readable storage medium having instructions embodied thereon, the instructions being executable by one or more processors to perform a method for initiating communication between artificial reality devices. The method may include enabling a discovery setting by a first user wearing a first artificial reality device. The method may include detecting a presence of at least a second user wearing a second artificial reality device. The second user may be different from the first user. The second artificial reality device may be different from the first artificial reality device. The discovery setting may be also enabled on the second artificial reality device. The method may include determining a familiarity level of the first user with the second user. The method may include, in response to the familiarity level breaching a familiarity threshold, initiating a call with the second artificial reality device by the first artificial reality device, the call including an interaction in an artificial reality environment accessed via the first artificial reality device and the second artificial reality device.

Still another aspect of the present disclosure relates to a system configured for initiating communication between artificial reality devices. The system may include means for enabling a discovery setting by a first user wearing a first artificial reality device. The system may include means for detecting a presence of at least a second user wearing a second artificial reality device. The second user may be different from the first user. The second artificial reality device may be different from the first artificial reality device. The discovery setting may be also enabled on the second artificial reality device. The system may include means for determining a familiarity level of the first user with the second user. The system may include means for, in response to the familiarity level breaching a familiarity threshold, initiating a call with the second artificial reality device by the first artificial reality device, the call including an interaction in an artificial reality environment accessed via the first artificial reality device and the second artificial reality device.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
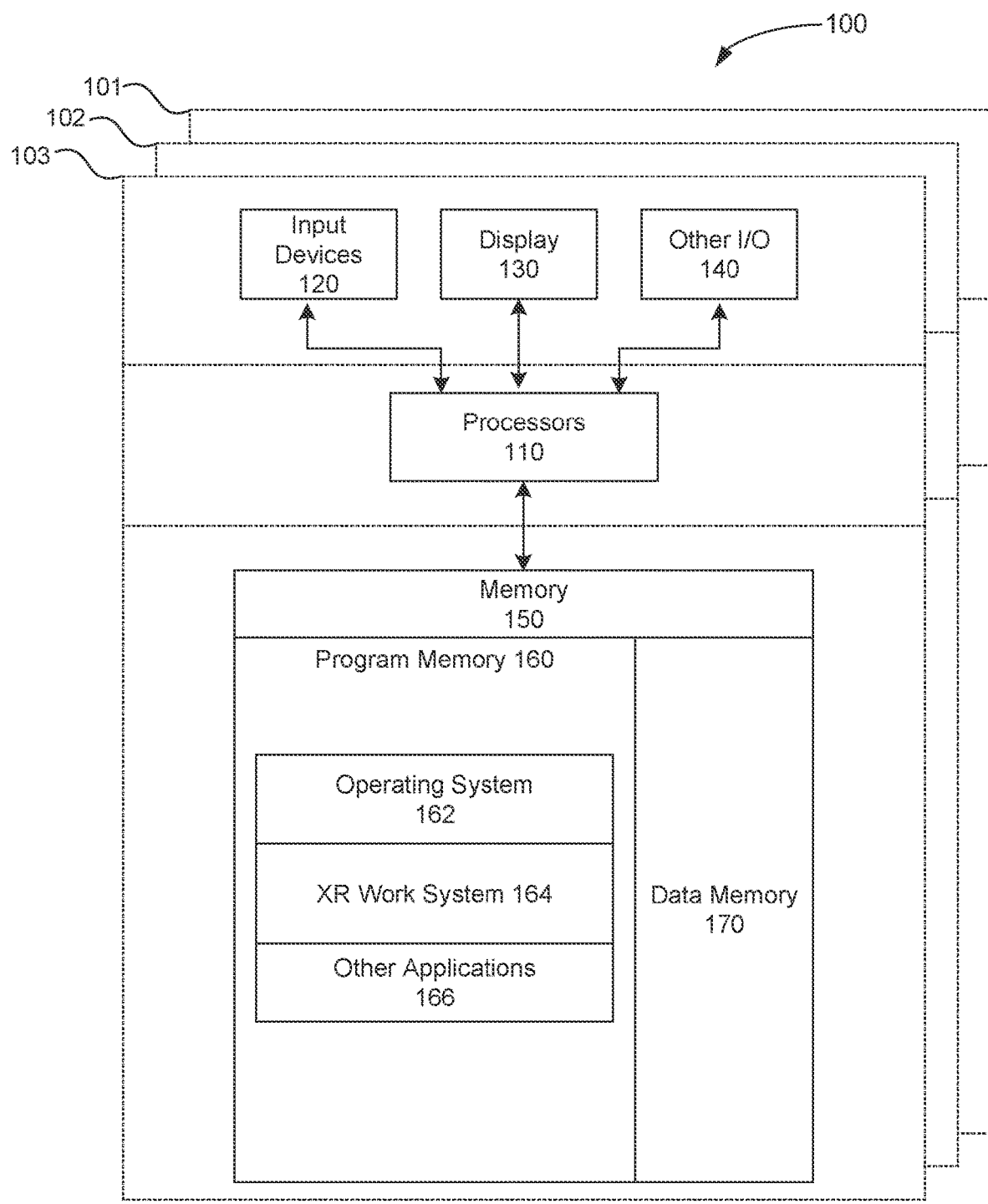
FIG. 1 is a block diagram illustrating an overview of devices on which some implementations of the disclosed technology can operate.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Because wearing an artificial reality headset can impact one's awareness of their immediate physical surroundings, a person wearing an artificial reality headset in everyday life may miss opportunities for real life interactions with people they may otherwise wish to engage with in person. Conventionally, engaging with another person in an artificial reality environment requires an overt act by a user to initiate an interaction. The overt act is performed only after the user decides they want to converse with the other person. If the user is not aware that the other person is nearby or approaching them, it may not occur to them to initiate a conversation with the other person and an opportunity to connect in real life may be lost.

The subject disclosure provides for systems and methods for initiating communication between artificial reality devices. A user is allowed to be alerted in an artificial reality environment that a familiar person is nearby or approaching the user in the real world. For example, the user may receive a notification via their artificial reality headset that the familiar person is nearing, which lets them opt to ignore or engage the familiar person in the virtual reality environment before the familiar person is within speaking distance of the user.

Implementations described herein address these and other problems by allowing a user of an artificial reality headset to connect with other artificial reality headset users in the user's physical proximity without the user having to make a conscious decision to consider initiating the interaction. In exemplary implementations, real-world positions may be determined of other artificial reality headset users relative to the real-world position of the user. If a familiar user is approaching in the real world, the user may receive an indication via their artificial reality headset that the other user is approaching, even if the other user is not in the user's line of sight or hard to spot in a large crowd. The users may optionally begin their conversation in the artificial reality environment before they are next to each other in the real world.

Implementations of the disclosed technology may include or be implemented in conjunction with an artificial reality system. Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some implementations, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, an MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can create, administer, and provide interaction modes for an artificial reality collaborative working environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.). Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across one of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
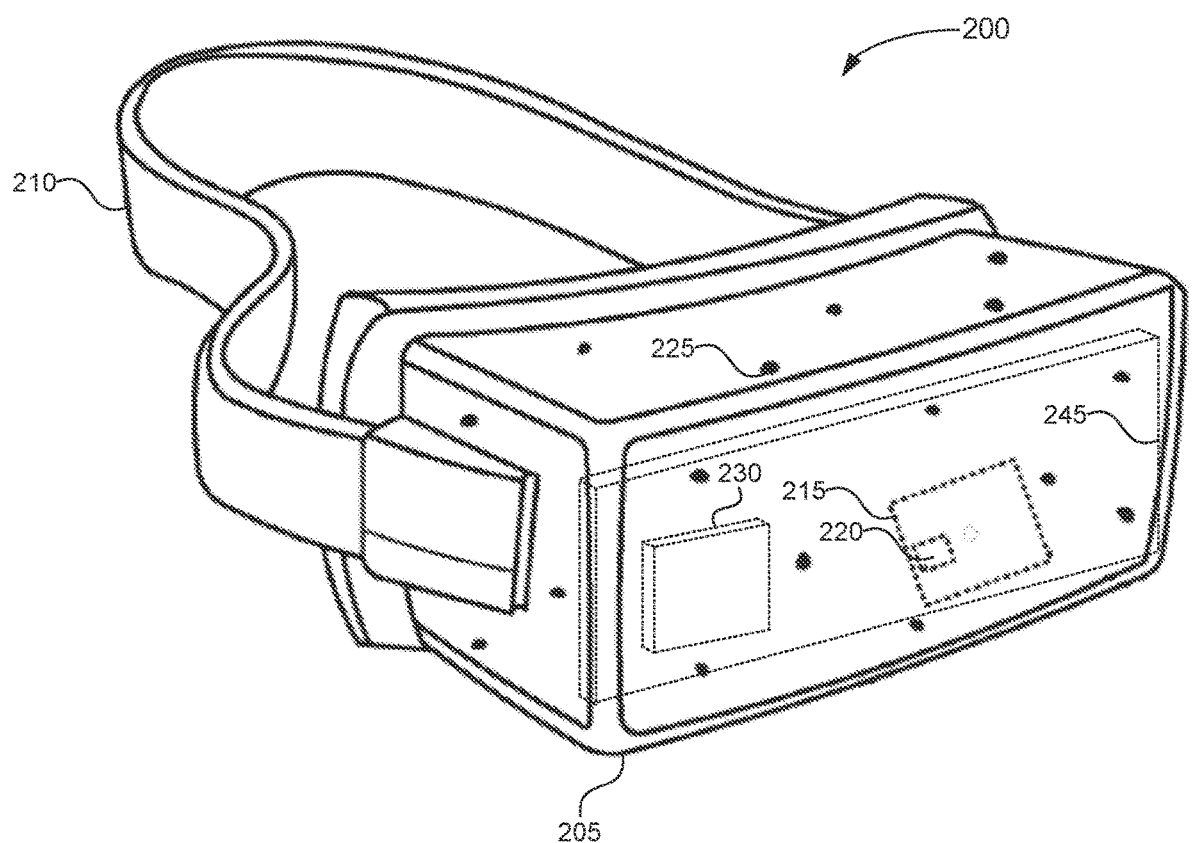
FIG. 2A is a wire diagram of a virtual reality headset, according to certain aspects of the disclosure.

FIG. 2A is a wire diagram of a virtual reality head-mounted display (HMD) 200, in accordance with some implementations. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include, e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various implementations, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
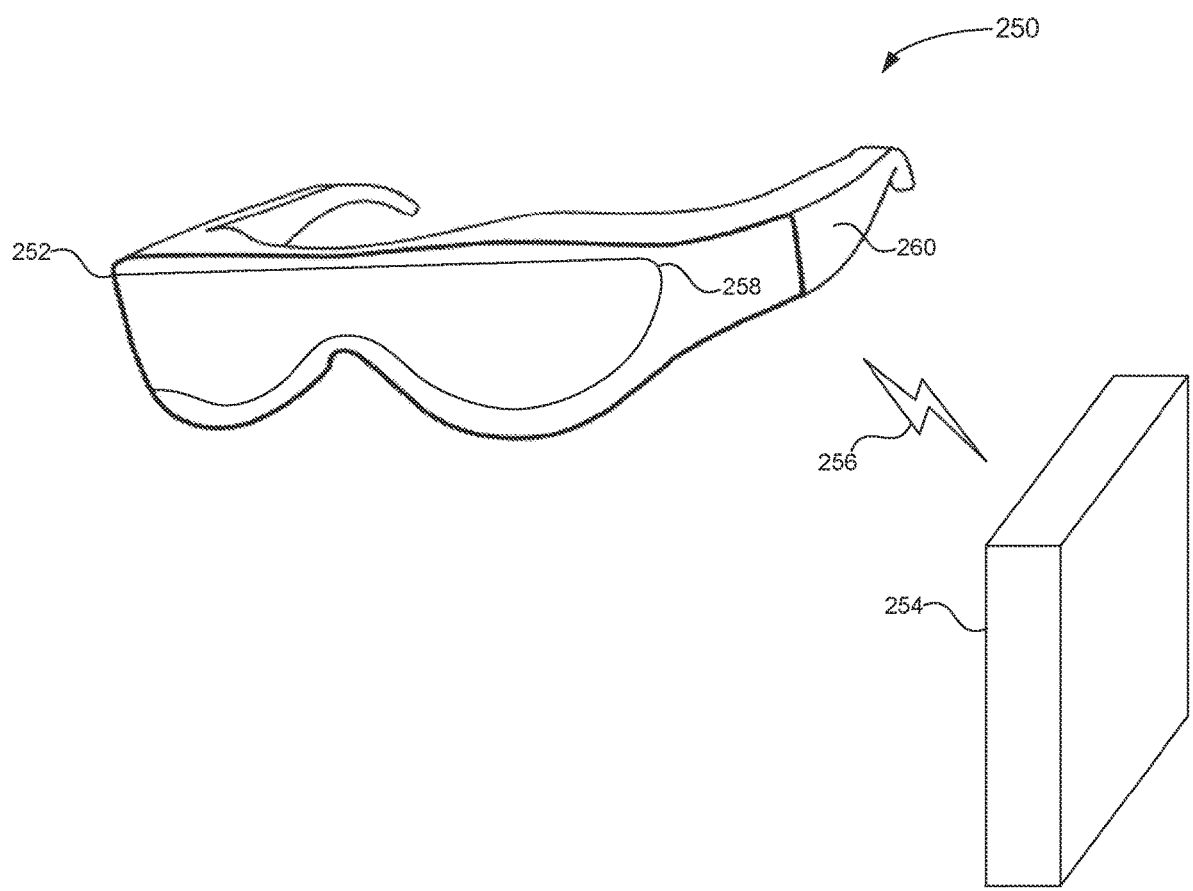
FIG. 2B is a wire diagram of a mixed reality head-mounted display (HMD) system which includes a mixed reality HMD and a core processing component, according to certain aspects of the disclosure.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

The disclosed system(s) address a problem in traditional initiating communication between artificial reality devices techniques tied to computer technology, namely, the technical problem of decreased real-world spatial awareness caused when wearing artificial reality headsets. The disclosed system solves this technical problem by providing a solution also rooted in computer technology, namely, by providing for obfuscating an exact location of a user. The disclosed subject technology further provides improvements to the functioning of the computer itself because it improves processing and efficiency in initiating communication between artificial reality devices.

Figure 3:
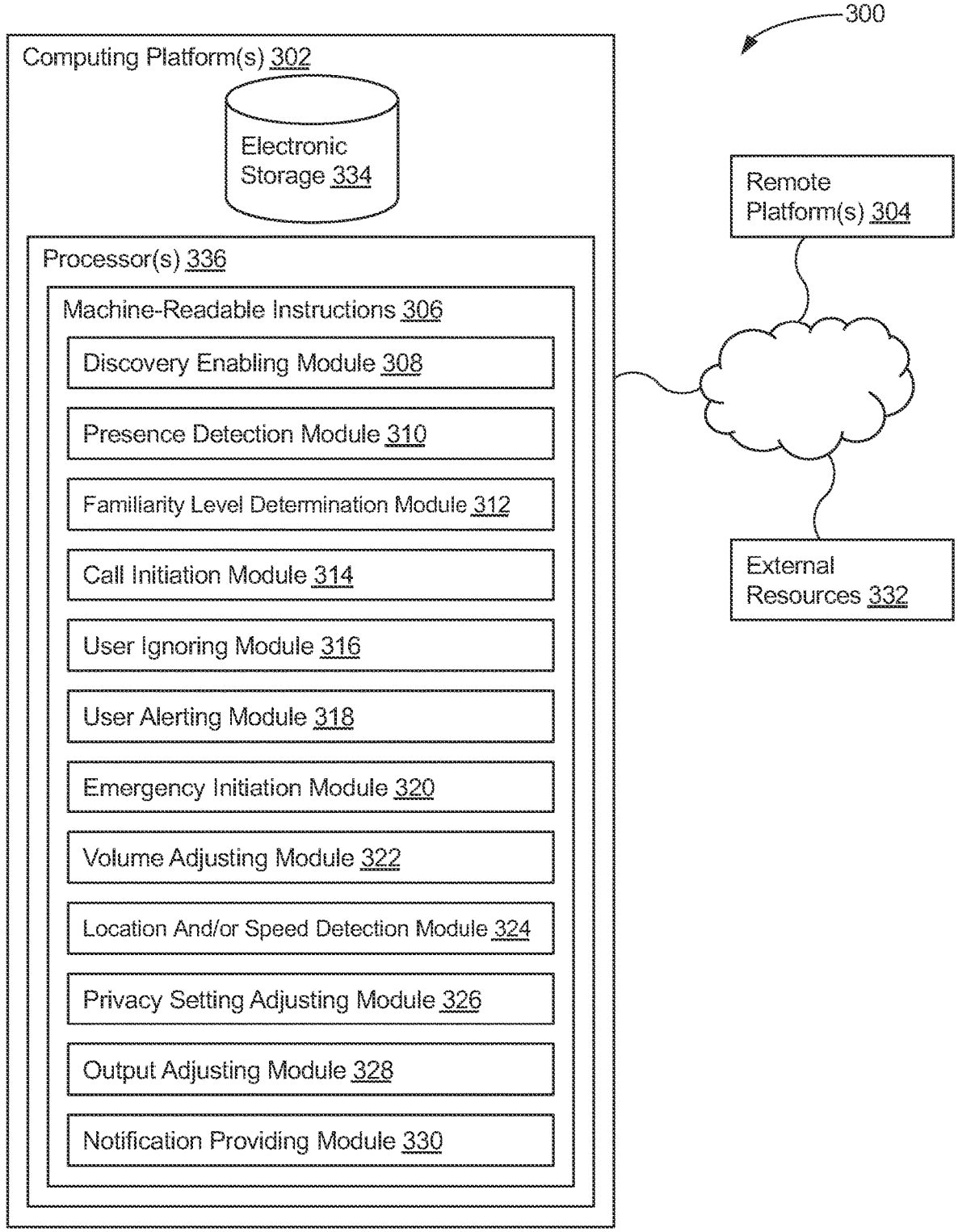
FIG. 3 illustrates a system configured for initiating communication between artificial reality devices, according to certain aspects of the disclosure.

FIG. 3 illustrates a system 300 configured for initiating communication between artificial reality devices, according to certain aspects of the disclosure. In some implementations, system 300 may include one or more computing platforms 302. Computing platform(s) 302 may be configured to communicate with one or more remote platforms 304 according to a client/server architecture, a peer-to-peer architecture, and/or other architectures. Remote platform(s) 304 may be configured to communicate with other remote platforms via computing platform(s) 302 and/or according to a client/server architecture, a peer-to-peer architecture, and/or other architectures. Users may access system 300 via computing platform(s) 302 and/or remote platform(s) 304.

Computing platform(s) 302 may be configured by machine-readable instructions 306. Machine-readable instructions 306 may include one or more instruction modules. The instruction modules may include computer program modules. The instruction modules may include one or more of discovery enabling module 308, presence detection module 310, familiarity level determination module 312, call initiation module 314, user ignoring module 316, user alerting module 318, emergency initiation module 320, volume adjusting module 322, location and/or speed detection module 324, privacy setting adjusting module 326, output adjusting module 328, notification providing module 330, and/or other instruction modules.

Discovery enabling module 308 may be configured to enable a discovery setting by a first user wearing a first artificial reality device. The discovery setting may allow for other users to discover the first user. Discovering the first user may include being alerted as to the first user's nearby presence. In some implementations, the artificial reality device may include an artificial reality headset. The artificial reality headset may be configured to allow the user to access an artificial reality environment (e.g., augmented reality, mixed reality, virtual reality, etc.). The user may interact with the artificial reality environment through one or more of gestures, voice commands, biometric responses, and/or other interactions. In some implementations, by way of non-limiting example, the artificial reality device may be connected to a wireless network through at least one of Wi-Fi, Bluetooth, or cellular data. It is understood that the artificial reality headset includes the class of audio only glasses (e.g., AMAZON ECHOFRAMES, BOSE FRAMES, etc.) as well as standard artificial reality headsets (e.g., OCULUS, etc.), and the like.

Presence detection module 310 may be configured to detect a presence of at least a second user wearing a second artificial reality device. The presence may be within a range of the first user. By way of non-limiting example, the range may be within 10 meters, 25 meters, 50 meters, 100 meters, 200 meters, or 400 meters between the first user and the second user. The range can be controlled by the user. Different methods may be utilized for physically locating other users relative to the user based on a distance of individual ones of the other users to the user.

The second user may be different from the first user. The second artificial reality device may be different from the first artificial reality device. The discovery setting may be also enabled on the second artificial reality device.

Familiarity level determination module 312 may be configured to determine a familiarity level of the first user with the second user. By way of non-limiting example, the familiarity level may be based on one or more of social media, contacts, or message history. The familiarity threshold may be based on a number of interactions between the first user and the second user. By way of non-limiting example, the number of interactions may be based on one or more of a frequency and/or recency of past messages and/or calls, a frequency and/or recency of real-world contacts, a relationship closeness and/or category, a number and/or closeness of common social connections, a sentiment analysis of past interactions, or a duration of past interactions.

Call initiation module 314 may be configured to, in response to the familiarity level breaching a familiarity threshold, automatically initiate a call with the second artificial reality device by the first artificial reality device. The call may include an interaction in an artificial reality environment accessed via the first artificial reality device and the second artificial reality device. The call may be a video call. In some implementations, the video call may include a video feed of a given user and/or a three-dimensional digital likeness of the given user. The call may include a chat capability. The call may include a display of a real-time transcript of vocal speech as users converse. The call may include a display of information that is relevant to the user's conversation. For example, if a user says to the other user "I just bought a car," information about the make and model of car may be presented in the artificial reality environment. The call may include a visual indicator (e.g., an arrow, a person icon, etc.) of where the other person is located in relation to the user and where the user is facing.

User ignoring module 316 may be configured to, in response to the familiarity level failing to breach the familiarity threshold, ignore the second user. Ignoring the second user may include failing to present an opportunity for the second user to engage the first user in the artificial reality environment. Ignoring the second user may include making the first user's artificial reality device undetectable by the second user's artificial reality device.

User alerting module 318 may be configured to alert the first user to the familiarity level failing to breach the familiarity threshold. The alert may include a notification in the artificial reality environment.

Emergency initiation module 320 may be configured to initiate an emergency call when an emergency is detected. By way of non-limiting example, the emergency may be detected through one or more of changes in a pace of the first user, detection of the first user being in a dangerous and/or unfamiliar area, or detection of a dangerous individual in the vicinity of the first user.

Volume adjusting module 322 may be configured to adjust a volume and/or pitch of the call during an approach to and/or retreat from the first user by the second user. Adjusting a volume and/or pitch of the call may include turning off the volume of the call when the first user and the second user are within a normal talking distance. In some implementations, the normal talking distance may be within approximately 3 meters. Adjusting a volume and/or pitch of the call may include increasing a pitch and/or volume of the call during the approach to the first user by the second user. Adjusting a volume and/or pitch of the call may include decreasing a pitch and/or volume of the call during the retreat from the first user by the second user.

Location and/or speed detection module 324 may be configured to detect a location and/or speed of the user. The location and/or speed of the user may be used to determine whether the first user is travelling by foot, by car, by boat, by train, by plane, and/or other mode of travel.

Privacy setting adjusting module 326 may be configured to adjust a privacy setting of the first artificial reality device based on the detected location and/or speed. Adjusting the privacy setting may include a do not disturb setting that automatically turns on responsive to the detected location and/or speed being indicative of the user presently driving a car. The do not disturb setting may prevent the first user's artificial reality device from providing notifications to the first user.

Output adjusting module 328 may be configured to adjust an audio output of the first artificial reality device to reflect a direction of approach to and/or retreat from the first user by the second user. Adjusting an audio output may include providing a three-dimensional audio effect such that sound is perceivable as originating from the approach to and/or retreat from the first user by the second user.

Notification providing module 330 may be configured to provide notifications of individuals travelling near the first user. The notifications may be provided in the artificial reality environment via the first user's artificial reality device. By way of non-limiting example, the first user and the second user may interact with the notifications to choose to interact with a nearby user, send a message, ignore, or deny a call.

In some implementations, computing platform(s) 302, remote platform(s) 304, and/or external resources 332 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 302, remote platform(s) 304, and/or external resources 332 may be operatively linked via some other communication media.

A given remote platform 304 may include one or more processors configured to execute computer program modules. The computer program modules may be configured to enable an expert or user associated with the given remote platform 304 to interface with system 300 and/or external resources 332, and/or provide other functionality attributed herein to remote platform(s) 304. By way of non-limiting example, a given remote platform 304 and/or a given computing platform 302 may include one or more of an artificial reality device, a server, a desktop computer, a laptop computer, a handheld computer, a tablet computing platform, a NetBook, a Smartphone, a gaming console, and/or other computing platforms.

External resources 332 may include sources of information outside of system 300, external entities participating with system 300, and/or other resources. In some implementations, some or all of the functionality attributed herein to external resources 332 may be provided by resources included in system 300.

Computing platform(s) 302 may include electronic storage 334, one or more processors 336, and/or other components. Computing platform(s) 302 may include communication lines, or ports to enable the exchange of information with a network and/or other computing platforms. Illustration of computing platform(s) 302 in FIG. 3 is not intended to be limiting. Computing platform(s) 302 may include a plurality of hardware, software, and/or firmware components operating together to provide the functionality attributed herein to computing platform(s) 302. For example, computing platform(s) 302 may be implemented by a cloud of computing platforms operating together as computing platform(s) 302.

Electronic storage 334 may comprise non-transitory storage media that electronically stores information. The electronic storage media of electronic storage 334 may include one or both of system storage that is provided integrally (i.e., substantially non-removable) with computing platform(s) 302 and/or removable storage that is removably connectable to computing platform(s) 302 via, for example, a port (e.g., a USB port, a firewire port, etc.) or a drive (e.g., a disk drive, etc.). Electronic storage 334 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 334 may include one or more virtual storage resources (e.g., cloud storage, a virtual private network, and/or other virtual storage resources). Electronic storage 334 may store software algorithms, information determined by processor(s) 336, information received from computing platform(s) 302, information received from remote platform(s) 304, and/or other information that enables computing platform(s) 302 to function as described herein.

Processor(s) 336 may be configured to provide information processing capabilities in computing platform(s) 302. As such, processor(s) 336 may include one or more of a digital processor, an analog processor, a digital circuit designed to process information, an analog circuit designed to process information, a state machine, and/or other mechanisms for electronically processing information. Although processor(s) 336 is shown in FIG. 3 as a single entity, this is for illustrative purposes only. In some implementations, processor(s) 336 may include a plurality of processing units. These processing units may be physically located within the same device, or processor(s) 336 may represent processing functionality of a plurality of devices operating in coordination. Processor(s) 336 may be configured to execute modules 308, 310, 312, 314, 316, 318, 320, 322, 324, 326, 328, and/or 330, and/or other modules. Processor(s) 336 may be configured to execute modules 308, 310, 312, 314, 316, 318, 320, 322, 324, 326, 328, and/or 330, and/or other modules by software; hardware; firmware; some combination of software, hardware, and/or firmware; and/or other mechanisms for configuring processing capabilities on processor(s) 336. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 308, 310, 312, 314, 316, 318, 320, 322, 324, 326, 328, and/or 330 are illustrated in FIG. 3 as being implemented within a single processing unit, in implementations in which processor(s) 336 includes multiple processing units, one or more of modules 308, 310, 312, 314, 316, 318, 320, 322, 324, 326, 328, and/or 330 may be implemented remotely from the other modules. The description of the functionality provided by the different modules 308, 310, 312, 314, 316, 318, 320, 322, 324, 326, 328, and/or 330 described below is for illustrative purposes, and is not intended to be limiting, as any of modules 308, 310, 312, 314, 316, 318, 320, 322, 324, 326, 328, and/or 330 may provide more or less functionality than is described. For example, one or more of modules 308, 310, 312, 314, 316, 318, 320, 322, 324, 326, 328, and/or 330 may be eliminated, and some or all of its functionality may be provided by other ones of modules 308, 310, 312, 314, 316, 318, 320, 322, 324, 326, 328, and/or 330. As another example, processor(s) 336 may be configured to execute one or more additional modules that may perform some or all of the functionality attributed below to one of modules 308, 310, 312, 314, 316, 318, 320, 322, 324, 326, 328, and/or 330.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 4:
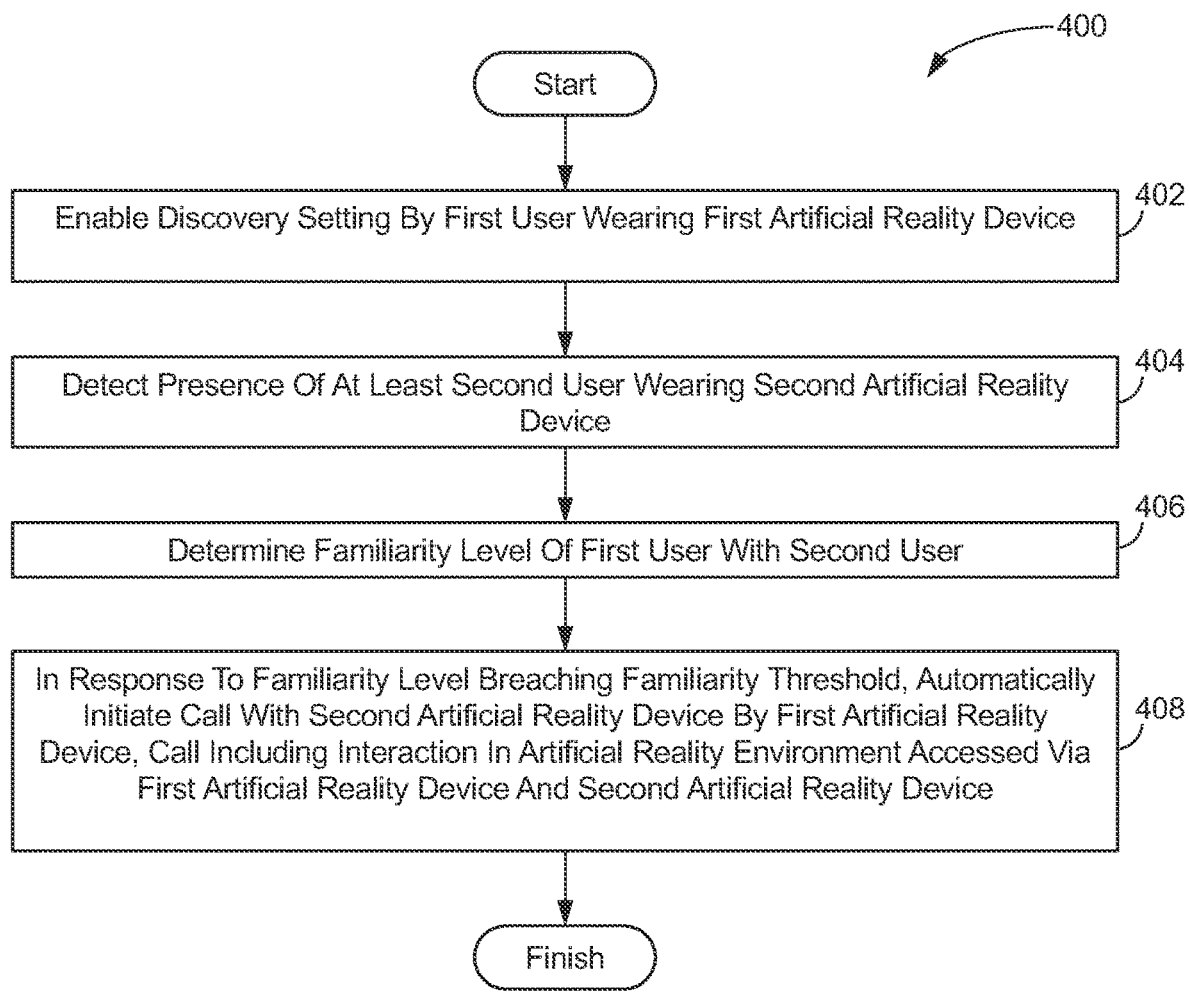
FIG. 4 illustrates an example flow diagram for initiating communication between artificial reality devices, according to certain aspects of the disclosure.

FIG. 4 illustrates an example flow diagram (e.g., process 400) for initiating communication between artificial reality devices, according to certain aspects of the disclosure. For explanatory purposes, the example process 400 is described herein with reference to FIGS. 1-3. Further for explanatory purposes, the steps of the example process 400 are described herein as occurring in serial, or linearly. However, multiple instances of the example process 400 may occur in parallel. For purposes of explanation of the subject technology, the process 400 will be discussed in reference to FIGS. 1-3.

At step 402, the process 400 may include enabling a discovery setting by a first user wearing a first artificial reality device, through discovery enabling module 308. At step 404, the process 400 may include detecting a presence of at least a second user wearing a second artificial reality device, through presence detection module 310. The second user may be different from the first user. The second artificial reality device may be different from the first artificial reality device. The discovery setting may be also enabled on the second artificial reality device. At step 406, the process 400 may include determining a familiarity level of the first user with the second user, through familiarity level determination module 312. At step 408, the process 400 may include in response to the familiarity level breaching a familiarity threshold, initiating a call with the second artificial reality device by the first artificial reality device, the call including an interaction in an artificial reality environment accessed via the first artificial reality device and the second artificial reality device, through call initiation module 314.

For example, as described above in relation to FIGS. 1-3, at step 402, the process 400 may include enabling a discovery setting by a first user wearing a first artificial reality device, through discovery enabling module 308. At step 404, the process 400 may include detecting a presence of at least a second user wearing a second artificial reality device, through presence detection module 310. The second user may be different from the first user. The second artificial reality device may be different from the first artificial reality device. The discovery setting may be also enabled on the second artificial reality device. At step 406, the process 400 may include determining a familiarity level of the first user with the second user, through familiarity level determination module 312. At step 408, the process 400 may include in response to the familiarity level breaching a familiarity threshold, initiating a call with the second artificial reality device by the first artificial reality device, the call including an interaction in an artificial reality environment accessed via the first artificial reality device and the second artificial reality device, through call initiation module 314.

According to an aspect, the artificial reality device comprises an artificial reality headset.

According to an aspect, the discovery setting allows for other users to discover the user.

According to an aspect, the artificial reality device is connected to a wireless network through at least one of Wi-Fi, Bluetooth, or cellular data.

According to an aspect, the familiarity level is based on one or more of social media, contacts, or message history.

According to an aspect, the presence is within a range of the user.

According to an aspect, the familiarity threshold may be based on a number of interactions between the users.

According to an aspect, the call is a video call, the video call including a video feed of a given user and/or a three-dimensional digital likeness of the given user.

According to an aspect, the call includes a chat capability.

According to an aspect, the process 400 further includes, in response to the familiarity level failing to breach the familiarity threshold, ignoring the second user.

According to an aspect, the process 400 further includes alerting the user to the familiarity level failing to breach the familiarity threshold.

According to an aspect, the process 400 further includes initiating an emergency call when an emergency is detected.

According to an aspect, the emergency may be detected through one or more of changes in a pace of the user, detection of the user being in a dangerous and/or unfamiliar area, or detection of a dangerous individual in the vicinity of the first user.

According to an aspect, the process 400 further includes adjusting a volume and/or pitch of the call during an approach to and/or retreat from the first user by the second user.

According to an aspect, the process 400 further includes detecting a location and/or speed of the user to determine whether the first user is travelling by foot, by car, by boat, by train, and/or by plane.

According to an aspect, the process 400 further includes adjusting a privacy setting of the first artificial reality device based on the detected location and/or speed.

According to an aspect, the process 400 further includes adjusting an audio output of the first artificial reality device to reflect a direction of approach to and/or retreat from the first user by the second user.

According to an aspect, the process 400 further includes providing notifications of individuals travelling near the first user.

Figure 5:
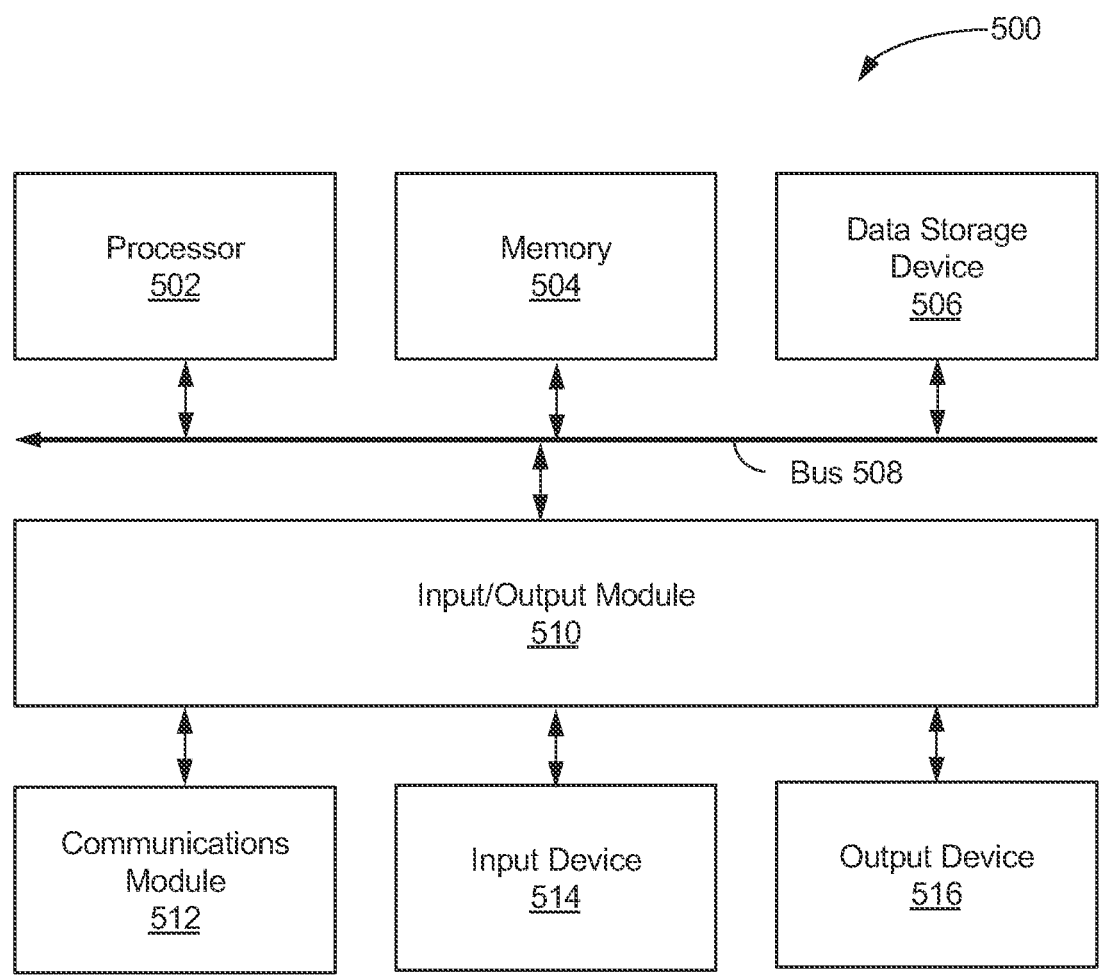
FIG. 5 is a block diagram illustrating an example computer system (e.g., representing both client and server) with which aspects of the subject technology can be implemented.

FIG. 5 is a block diagram illustrating an exemplary computer system 500 with which aspects of the subject technology can be implemented. In certain aspects, the computer system 500 may be implemented using hardware or a combination of software and hardware, either in a dedicated server, integrated into another entity, or distributed across multiple entities.

Computer system 500 (e.g., server and/or client) includes a bus 508 or other communication mechanism for communicating information, and a processor 502 coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer-readable medium for execution by, or to control the operation of, the computer system 500, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 include networking interface cards, such as Ethernet cards and modems. In certain aspects, the input/output module 510 is configured to connect to a plurality of devices, such as an input device 514 and/or an output device 516. Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 516 include display devices such as an LCD (liquid crystal display) monitor, for displaying information to the user.

According to one aspect of the present disclosure, the above-described gaming systems can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in the main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a PDA, a mobile audio player, a Global Positioning System (GPS) receiver, a video game console, and/or a television set top box.

The term "machine-readable storage medium" or "computer-readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 500 reads game data and provides a game, information may be read from the game data and stored in a memory device, such as the memory 504. Additionally, data from the memory 504 servers accessed via a network the bus 508, or the data storage 506 may be read and loaded into the memory 504. Although data is described as being found in the memory 504, it will be understood that data does not have to be stored in the memory 504 and may be stored in other memory accessible to the processor 502 or distributed among several media, such as the data storage 506.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for initiating communication between artificial reality devices, comprising:
enabling a discovery setting by a first user wearing a first artificial reality device;
detecting a presence of at least a second user wearing a second artificial reality device, the second user being different from the first user, the second artificial reality device being different from the first artificial reality device, wherein the discovery setting is also enabled on the second artificial reality device;
determining a familiarity level of the first user with the second user; and
in response to the familiarity level breaching a familiarity threshold, initiating a call with the second artificial reality device by the first artificial reality device, the call including an interaction in an artificial reality environment accessed via the first artificial reality device and the second artificial reality device.

2. The computer-implemented method of claim 1, wherein at least the first artificial reality device comprises an artificial reality headset.

3. The computer-implemented method of claim 1, wherein the discovery setting allows for other users to discover the first user.

4. The computer-implemented method of claim 1, wherein the first and second artificial reality devices are connected to a wireless network through at least one of Wi-Fi, Bluetooth, or cellular data.

5. The computer-implemented method of claim 1, wherein the familiarity level is based on one or more of social media, contacts, or message history.

6. The computer-implemented method of claim 1, wherein the presence is within a range of the first user.

7. The computer-implemented method of claim 1, wherein the familiarity threshold may be based on a number of interactions between the first user and the second user.

8. The computer-implemented method of claim 1, wherein the call is a video call, the video call including a video feed of a given user and/or a three-dimensional digital likeness of the given user.

9. The computer-implemented method of claim 1, wherein the call includes a chat capability.

10. The computer-implemented method of claim 1, further comprising:
in response to the familiarity level failing to breach the familiarity threshold, ignoring the second user.

11. A system configured for initiating communication between artificial reality devices, the system comprising:
one or more hardware processors configured by machine-readable instructions to:
enable a discovery setting by a first user wearing a first artificial reality device;
detect a presence of at least a second user wearing a second artificial reality device, the second user being different from the first user, the second artificial reality device being different from the first artificial reality device, wherein the discovery setting is also enabled on the second artificial reality device;
determine a familiarity level of the first user with the second user; and
in response to the familiarity level breaching a familiarity threshold, initiate a call with the second artificial reality device by the first artificial reality device, the call including an interaction in an artificial reality environment accessed via the first artificial reality device and the second artificial reality device, wherein the call includes a chat capability.

12. The system of claim 11, wherein at least the first artificial reality device comprises an artificial reality headset.

13. The system of claim 11, wherein the discovery setting allows for other users to discover the first user.

14. The system of claim 11, wherein the first and second artificial reality devices are connected to a wireless network through at least one of Wi-Fi, Bluetooth, or cellular data.

15. The system of claim 11, wherein the familiarity level is based on one or more of social media, contacts, or message history.

16. The system of claim 11, wherein the presence is within a range of the first user.

17. The system of claim 11, wherein the familiarity threshold may be based on a number of interactions between the first user and the second user.

18. The system of claim 11, wherein the call is a video call, the video call including a video feed of a given user and/or a three-dimensional digital likeness of the given user.

19. The system of claim 11, wherein the one or more hardware processors are further configured by machine-readable instructions to:
in response to the familiarity level failing to breach the familiarity threshold, ignore the second user.

20. A non-transient computer-readable storage medium having instructions embodied thereon, the instructions being executable by one or more processors to perform a method for initiating communication between artificial reality devices, the method comprising:
enabling a discovery setting by a first user wearing a first artificial reality device, wherein the artificial reality device comprises an artificial reality headset;
detecting a presence of at least a second user wearing a second artificial reality device, the second user being different from the first user, the second artificial reality device being different from the first artificial reality device, wherein the discovery setting is also enabled on the second artificial reality device;
determining a familiarity level of the first user with the second user; and
in response to the familiarity level breaching a familiarity threshold, initiating a call with the second artificial reality device by the first artificial reality device, the call including an interaction in an artificial reality environment accessed via the first artificial reality device and the second artificial reality device, wherein the call includes a chat capability, wherein the familiarity level is based on one or more of social media, contacts, or message history.

* * * * *